United States Patent
Cosic et al.

(10) Patent No.: US 12,298,007 B2
(45) Date of Patent: May 13, 2025

(54) COMBUSTION CHAMBER OF A GAS TURBINE, GAS TURBINE AND METHOD FOR OPERATING THE SAME

(71) Applicant: MAN Energy Solutions SE, Augsburg (DE)

(72) Inventors: Bernhard Cosic, Düsseldorf (DE);
Frank Reiss, Lauchringen (DE);
Roman Proebster, Düsseldorf (DE)

(73) Assignee: MAN Energy Solutions SE, Augsburg (DE)

( * ) Notice: Subject to any disclaimer, the term of this patent is extended or adjusted under 35 U.S.C. 154(b) by 0 days.

(21) Appl. No.: 16/601,146

(22) Filed: Oct. 14, 2019

(65) Prior Publication Data
US 2020/0124284 A1 Apr. 23, 2020

(30) Foreign Application Priority Data
Oct. 18, 2018 (DE) ..................... 10 2018 125 848.8

(51) Int. Cl.
| | |
|---|---|
| *F23R 3/16* | (2006.01) |
| *F02C 7/22* | (2006.01) |
| *F02C 9/40* | (2006.01) |

(52) U.S. Cl.
CPC ............... *F23R 3/16* (2013.01); *F02C 7/22* (2013.01); *F02C 9/40* (2013.01); *F05D 2240/36* (2013.01)

(58) Field of Classification Search
CPC .... F23R 3/343; F23R 3/14; F23R 3/36; F23R 3/286; F23D 17/002; F23C 7/002; F02C 9/40; F02C 9/26
See application file for complete search history.

(56) References Cited

U.S. PATENT DOCUMENTS

| | | | |
|---|---|---|---|
| 2,701,164 A | | 2/1955 | Purchas, Jr. et al. |
| 3,121,996 A | * | 2/1964 | Smith ............... F23R 3/14 |
| | | | 60/748 |

(Continued)

FOREIGN PATENT DOCUMENTS

| | | |
|---|---|---|
| DE | 862599 C | 1/1953 |
| DE | 196 08 349 | 9/1997 |

(Continued)

OTHER PUBLICATIONS

Search Report dated Mar. 3, 2020 issued in Great Britain Patent Application No. 1913858.5.

(Continued)

*Primary Examiner* — Gerald L Sung
*Assistant Examiner* — Jacek Lisowski
(74) *Attorney, Agent, or Firm* — COZEN O'CONNOR (57) ABSTRACT

A combustion chamber of a gas turbine combusts a fuel in the presence of combustion air. The combustion chamber is configured as dual-fuel combustion chamber, wherein the combustion chamber, in a gas fuel operating mode, is supplied with a mixture of a gaseous fuel and combustion air via a main swirl body. In a liquid fuel operating mode, the combustion chamber is supplied with a liquid fuel via an atomization apparatus and combustion air via the main swirl body. The atomization apparatus has an atomization lance with an atomization nozzle centrally arranged with respect to a longitudinal center axis of a prechamber of the combustion chamber. The atomization nozzle of the central atomization lance includes a swirl chamber and, downstream of the swirl chamber, a nozzle orifice. The swirl chamber is supplied with the liquid fuel via a radial swirl generator and an axial swirl generator.

13 Claims, 4 Drawing Sheets

(56) References Cited

U.S. PATENT DOCUMENTS

| | | | | |
|---|---|---|---|---|
| 4,395,874 | A * | 8/1983 | Striebel | F23D 11/38 239/404 |
| 4,418,543 | A | 12/1983 | Faucher et al. | |
| 4,431,403 | A * | 2/1984 | Nowak | F23C 7/004 239/400 |
| 5,450,725 | A * | 9/1995 | Takahara | F23R 3/34 60/737 |
| 5,628,182 | A * | 5/1997 | Mowill | F23R 3/26 60/737 |
| 5,816,049 | A | 10/1998 | Joshi | |
| 5,934,555 | A | 8/1999 | Döbbeling et al. | |
| 2007/0075158 | A1* | 4/2007 | Pelletier | B05B 7/10 239/11 |
| 2007/0224562 | A1* | 9/2007 | Hiromitsu | F23R 3/286 431/182 |
| 2009/0044537 | A1* | 2/2009 | Boardman | F23R 3/286 60/737 |
| 2013/0097991 | A1* | 4/2013 | Zhang | F23K 5/06 60/39.59 |
| 2015/0362194 | A1* | 12/2015 | Ogata | F23R 3/286 60/39.463 |
| 2016/0033135 | A1* | 2/2016 | Chen | F23R 3/32 60/737 |
| 2016/0377291 | A1* | 12/2016 | Prociw | F02C 7/222 60/739 |
| 2017/0038074 | A1 | 2/2017 | Myers et al. | |
| 2018/0163637 | A1* | 6/2018 | Griffiths | F23R 3/343 |
| 2018/0209654 | A1 | 7/2018 | Reiss et al. | |
| 2019/0003712 | A1 | 1/2019 | Cosic et al. | |
| 2019/0170356 | A1 | 6/2019 | Cerutti | |

FOREIGN PATENT DOCUMENTS

| | | |
|---|---|---|
| DE | 698 02 133 | 3/2002 |
| DE | 696 17 290 | 6/2002 |
| DE | 10 2017 101 167 | 7/2018 |
| EP | 2 644 999 | 10/2013 |
| EP | 3465009 A1 | 4/2019 |
| FR | 963945 | 7/1950 |
| GB | 2 088 037 | 6/1982 |
| JP | 08-261465 | 10/1996 |
| JP | 09-327641 | 12/1997 |
| JP | 2009-047412 | 3/2009 |
| JP | 2018-119780 | 8/2018 |
| WO | WO 2017/207573 | 12/2017 |

OTHER PUBLICATIONS

German Search Report issued in corresponding German Application No. DE 10 2018 125 848.8.

Office Action dated May 7, 2020 issued in Sweden Patent Application No. 1951168-2.

Office Action dated Jun. 3, 2021 issued in Sweden Patent Application No. 1951168-2.

Office Action dated Feb. 18, 2021 issued in Great Britain Patent Application No. 1913858.5.

Office Action dated Feb. 6, 2023 issued in Japanese Patent Application No. 2019-190264.

Office Action dated Dec. 8, 2022 issued in Swedish Patent Application No. SE1951168-2.

* cited by examiner

COMBUSTION CHAMBER OF A GAS TURBINE, GAS TURBINE AND METHOD FOR OPERATING THE SAME

BACKGROUND OF THE INVENTION

1. Field of the Invention

The invention relates to a combustion chamber of a gas turbine. The invention, furthermore, relates to a gas turbine having such a combustion chamber and to a method for operating such a gas turbine.

2. Description of the Related Art

Gas turbines have a combustion chamber and a turbine arranged downstream of the combustion chamber. In the combustion chamber of a gas turbine, a fuel is combusted and hot exhaust gas produced in the process. The hot exhaust gas is expanded in the turbine of the gas turbine in order to extract energy which can serve for providing drive power, in order to drive a generator for example for generating electric current. In practice, gas turbines with dual fuel combustion chambers are known. In such a dual fuel combustion chamber, a gaseous fuel is combusted in a gas fuel operating mode and a liquid fuel is combusted in a liquid fuel operating mode. In the case fuel of the gas fuel operating mode, a mixture of a gaseous fuel and combustion air can be fed to the combustion chamber via a main swirl body. In the liquid fuel operating mode, the combustion chamber of the gas turbine can be supplied with fuel via an atomization apparatus and the combustion air supplied via the main swirl body.

There is a need for further improving combustion chambers designed as dual fuel combustion chambers so that a gas turbine with a dual fuel combustion chamber can be effectively ignited and run up from the stationary state in the liquid fuel operating mode, namely without the help of additional ignition nozzles or combustion gas.

Furthermore, there is a need in reducing undesirable exhaust gas emissions such as nitrogen oxide emissions after the start-up of the gas turbine in various load points in the liquid fuel operating mode.

SUMMARY OF THE INVENTION

Starting out from this, an object of the present invention is to create a new type of combustion chamber of a gas turbine, a gas turbine having such a combustion chamber and a method for operating such a gas turbine.

According to an aspect of the invention, an atomization apparatus comprises an atomization lance with an atomization nozzle that is central based on a longitudinal center axis of the combustion chamber or based on a longitudinal center axis of a prechamber of the combustion chamber, wherein the atomization nozzle of the central atomization lance comprises a swirl chamber and, downstream of the swirl chamber, a nozzle orifice, and wherein the swirl chamber can be supplied with the liquid fuel via a radial swirl generator and an axial swirl generator.

By way of the central atomization lance, which comprises the atomization nozzle with the swirl chamber, which can be supplied with the liquid fuel via the radial swirl generator and the axial swirl generator, a gas turbine can be effectively ignited and started up from the stationary state with a dual fuel combustion chamber in the liquid fuel operating mode, namely without the help of additional ignition nozzles or of combustion gas while reducing undesirable exhaust gas emissions such as nitrogen oxide emissions.

When igniting the gas turbine in the liquid fuel operating mode, the liquid fuel is introduced into the combustion chamber preferentially in such a manner that the swirl chamber of the atomization nozzle of the central atomization lance is exclusively supplied with the liquid fuel via the radial swirl generator. Then, a relatively wide spray cone or spray angle can be provided via the central atomization lance in order to favorably ignite the liquid fuel.

Following the igniting and the stabilization of the flame in the combustion chamber, the gas turbine on the start-up is accelerated from the stationary state wherein after an acceleration phase of the swirl chamber of the atomization nozzle of the central atomization lance the liquid fuel is also made available by way of the axial swirl generator. In the process, a narrower spray cone or spray angle then materializes in the region of the central atomization lance. By way of this, a wetting of combustion chamber walls of the combustion chamber with liquid fuel can be excluded, such exclusion being necessary for safe operation of the gas turbine or the combustion chamber.

Because the swirl chamber of the atomization nozzle of the central atomization lance can accordingly be supplied with the liquid fuel on the one hand via the radial swirl generator and on the other hand via the axial swirl generator, a gas turbine with a combustion chamber according to an aspect of the invention can be optimally ignited and started-up from the stationary state in the liquid fuel operating mode.

Preferentially, the liquid fuel can be fed to the radial swirl generator via a first fuel line and to the axial swirl generator via a separate, second fuel line. The first fuel line is assigned a first fuel valve and the second fuel line is assigned a second fuel valve.

In particular when the first fuel valve is open and the second fuel valve is closed and the liquid fuel is supplied to the swirl chamber exclusively via the radial swirl generator, the atomization nozzle of the central atomization lance provides an atomization cone with a spray angle that is greater than 60° and smaller than 100°.

In particular when the first and second fuel valves are open and the liquid fuel is supplied to the swirl chamber via the axial and the radial swirl generator, the atomization nozzle of the central atomization lance provides an atomization cone with a spray angle that is greater than 40° and smaller than 60°.

By way of the first fuel line with the first fuel valve and the second fuel line with the second fuel valve the radial swirl generator and the axial swirl generator, which serve for supplying the liquid fuel in the direction of the swirl chambers of the atomization nozzle of the central atomization lance, can be individually supplied with liquid fuel to thereby optimally supply the central atomization lance with fuel for the igniting and starting-up of the gas turbine and in the process make available spray angles for the atomized fuel via the central atomization lance that are optimal for igniting and starting-up the gas turbine. A spray angle of more than 60° and less than 100°, which is then provided when the swirl chamber of the atomization nozzle of the central atomization lance is supplied with the liquid fuel exclusively via the radial swirl generator is optimal for igniting the fuel. A spray angle of more than 40° and less than 60°, which materializes in particular when the liquid fuel is supplied to the swirl chamber of the atomization nozzle of the central atomization lance both via the axial swirl generator and also via the radial swirl generator, is optimal for the starting-up of the gas turbine following the igniting of the fuel.

According to a further development of the invention, the central atomization lance has a hood-like portion which, downstream of the nozzle orifice of the atomization nozzle of the central atomization lance and upstream of an outlet opening of the central atomization lance, defines a chamber which, via the nozzle orifice, can be supplied with the liquid fuel from the swirl chamber and the combustion air via a radial swirl generator, bypassing the main swirl body. The combustion air which can be supplied to the chamber formed downstream of the nozzle orifice of the atomization nozzle of the central atomization lance via the radial swirl generator, serves in particular for cooling the central atomization lance relative to a heat effect of a flame forming in the combustion chamber. The produced swirl jet of the combustion air interacts in the region of the outlet opening of the central atomization lance with the atomization cone of the atomization nozzle of the central atomization lance, which enters the chamber via the nozzle orifice. This interaction of the swirled combustion air with the spray cone of the liquid fuel in the region of the chamber is advantageous for an efficient and low-pollutant combustion. In particular when via the nozzle orifice of the atomization nozzle of the central atomization lance only small quantities of liquid fuel are atomized, a collapse of the atomization cone of the liquid fuel can be prevented via the swirled combustion air entering the chamber of the atomization nozzle of the atomization lance. Even when minute fuel quantities are to be introduced into the combustion chamber via the central atomization lance, a spray angle of at least 40° can be provided via the swirled combustion air introduced into the chamber of the central atomization lance downstream of the nozzle orifice of the atomization nozzle.

According to a further development of the invention, the atomization apparatus, in addition to the central atomization lance, comprises multiple atomization nozzles which are decentralized relative to the longitudinal center axis of the combustion chamber or relative to the longitudinal axis of the prechamber of the combustion chamber.

The further development of the invention, according to which the combustion chamber comprises multiple decentralized atomization nozzles in addition to the central atomization lance is particularly preferred in order to ensure low exhaust gas emissions such as nitrogen oxide emissions after the starting-up and running-up of the gas turbine in the liquid fuel operating mode. The decentralized atomization nozzles are preferentially utilized in addition to the central atomization lance in the liquid fuel operating mode for introducing liquid fuel into the combustion chamber when the gas turbine has reached its no-load rotational speed. Following the reaching of the no-load rotational speed of the gas turbine, i.e., when the liquid fuel is introduced into the combustion chamber both via the central atomization lance and also via the decentralized atomization nozzles, the liquid fuel is directly introduced via the central atomization lance into a recirculation zone within the combustion chamber or the prechamber, as a result of which a stable combustion can be achieved. Introducing the liquid fuel via the central atomization lance does not typically take place homogeneously with the combustion air, no intensive premixing of liquid fuel and combustion air takes place. By way of the decentralized atomization nozzles, the liquid fuel is homogeneously distributed in the combustion air. Furthermore, a part premixing of liquid fuel and combustion air is ensured by the decentralized atomization nozzles. In interaction with the central atomization lance, exhaust gas emissions such as nitrogen oxide emissions can be particularly advantageously reduced by way of the decentralized atomization nozzles.

The decentralized atomization nozzles are preferentially positioned on a circular path or pitch circle path extending about the longitudinal center axis of the combustion chamber or about the longitudinal center axis of the prechamber, wherein a center point of the circular path or pitch circle path, on which the decentralized atomization nozzles are positioned, is positioned on the longitudinal center axis of the combustion chamber or of the prechamber of the combustion chamber, and wherein a radius of the circular path or pitch circle path, on which the decentralized atomization nozzles are positioned, amounts to between 0.4 times and 1.1 times an inner radius of the main swirl body.

In particular when the decentralized atomization nozzles are positioned on such a circular path or pitch circle path, the liquid fuel, providing a homogeneous distribution of the same with the combustion air and with a view to a premixing of the same with the combustion air, can be optimally introduced into the combustion chamber as a result of which exhaust gas emissions such as nitrogen oxide emissions can be particularly greatly reduced.

The decentralized atomization nozzles, which are preferentially configured as self-excited nozzles providing an oscillating fluid jet, each provide an atomization cone with a spray angle that is greater than 50° and smaller than 90°. By way of such decentralized atomization nozzles, the liquid fuel can be optimally introduced into the combustion chamber while ensuring reduced exhaust gas emissions such as nitrogen oxide emissions. By way of the oscillating fluid jet, the mixing of the liquid fuel with the combustion air is favored. Wetting of walls of the combustion chamber and of the prechamber with liquid fuel is avoided. The fuel can be particularly homogeneously introduced into the combustion chamber. An effective combustion subject to the reduction of exhaust gas emissions is possible.

According to a first further development of the method according to an aspect of the invention, both the central atomization apparatus and also the decentralized atomization nozzles are utilized in the liquid fuel operating mode throughout the operating range between no load and full load in order to supply the combustion chamber with the liquid fuel. Individual atomization nozzles need not be switched on or off. By way of this, rapid load changes are possible. Purging procedures, such as would be necessary when switching off individual atomization nozzles, can be avoided. Exhaust gas emissions can be reduced.

According to a second further development of the method according to an aspect of the invention, the liquid fuel for igniting the gas turbine in the liquid fuel operating mode is exclusively supplied to the swirl chamber of the central atomization lance via the radial swirl generator, wherein after the igniting of the gas turbine the swirl chamber of the central atomization lance is additionally supplied with the liquid fuel via the axial swirl generator. The decentralized atomization nozzles are inactive during the igniting and starting-up. Once the no-load rotational speed has been reached, the decentralized atomization nozzles are switched on. The second further development of the method according to an aspect of the invention serves in particular for the optimal igniting and starting-up of the gas turbine from the stationary state. Following the start-up of the gas turbine with reaching of the no-load rotational speed, the method according to the first further development is employed.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention are explained in more detail by way of the drawings without being restricted to the drawings. In the drawings.

DETAILED DESCRIPTION OF THE PRESENTLY PREFERRED EMBODIMENTS

The invention relates to a combustion chamber of a gas turbine, to a gas turbine having a combustion chamber and to a method for operating a gas turbine.

Figure 1:
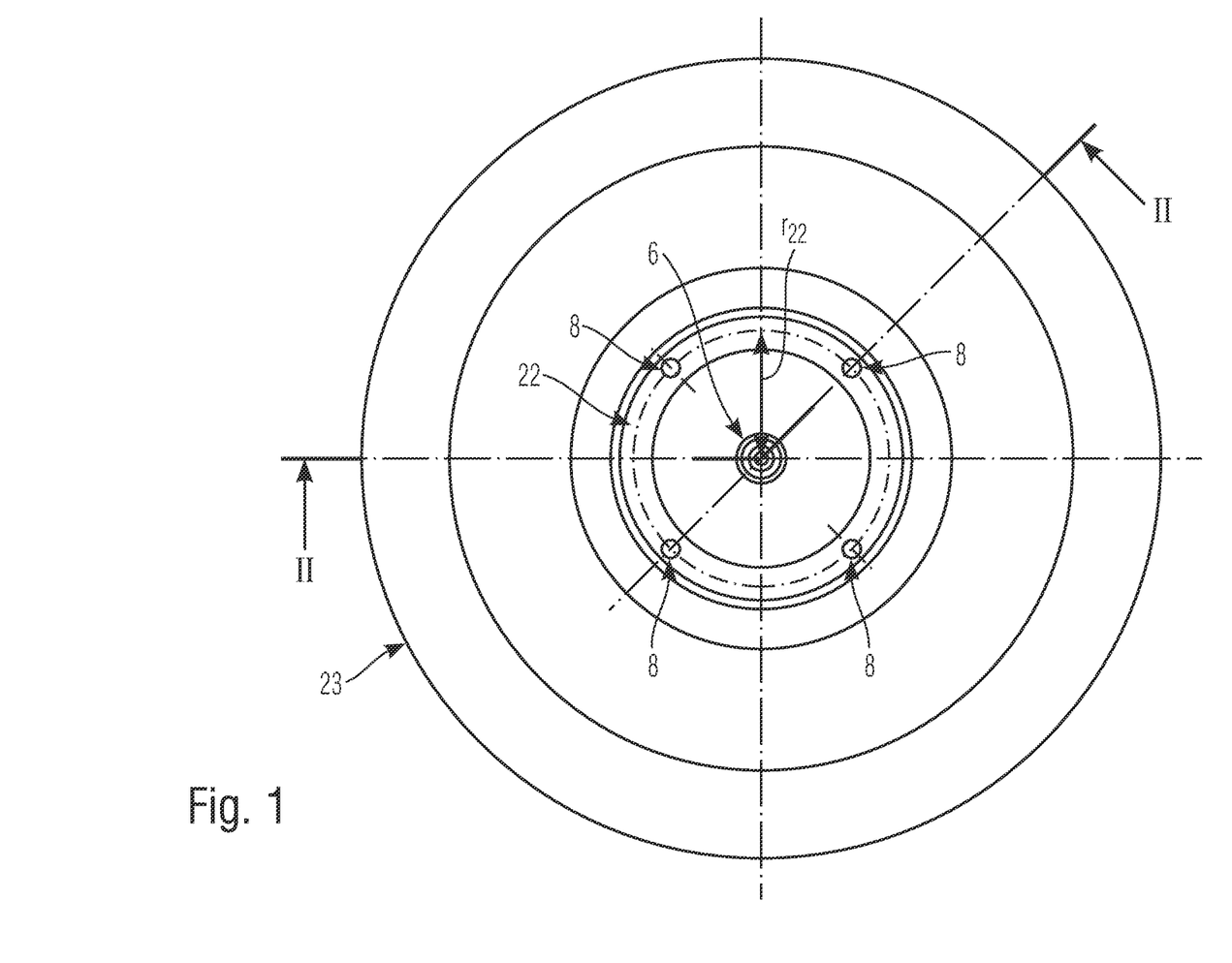
FIG. 1 is a highly schematic plan view of an atomization apparatus of a combustion chamber according to the invention of a gas turbine according to the invention.
Figure 2:
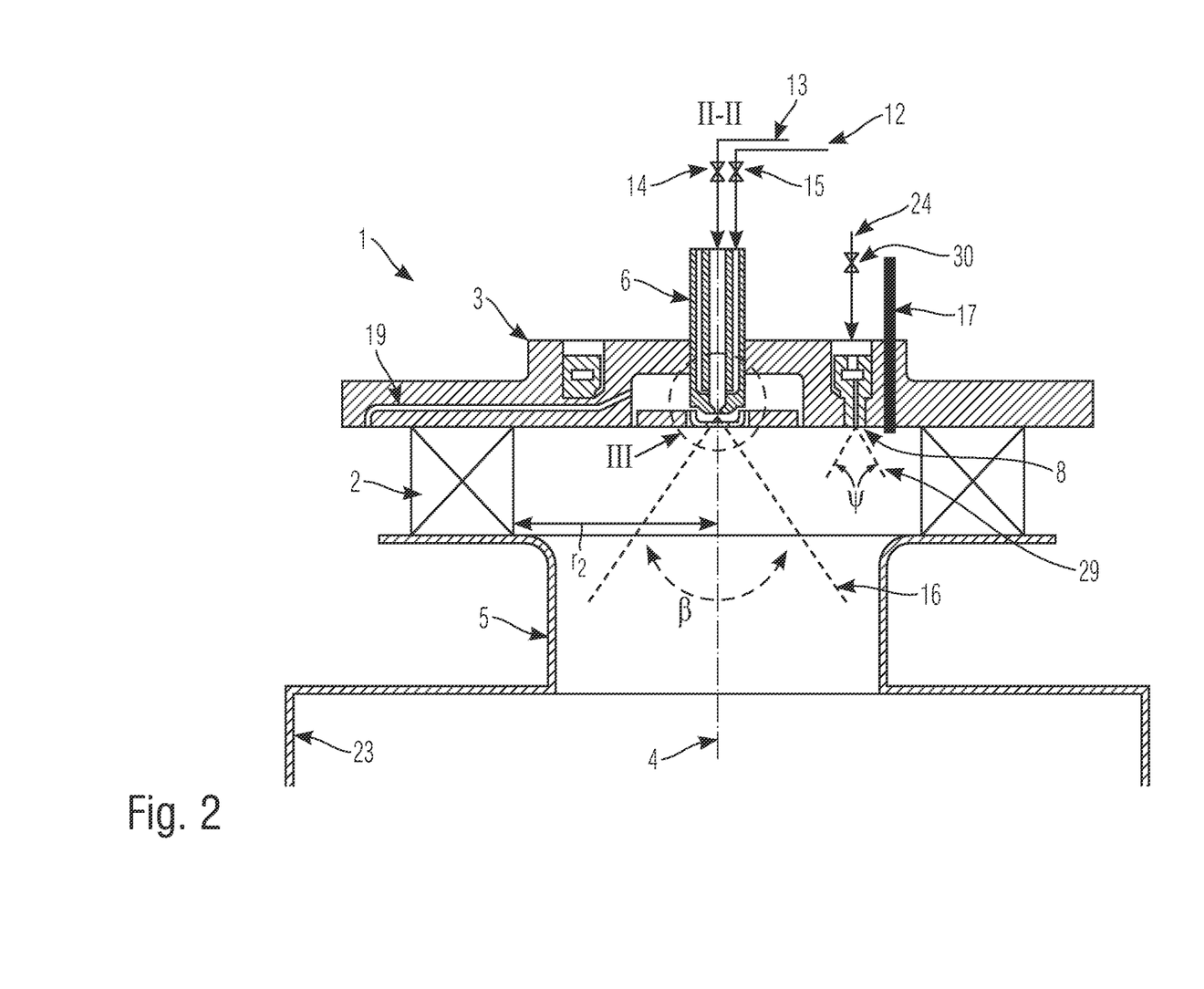
FIG. 2 shows the cross section II-II of FIG. 1.
Figure 3:
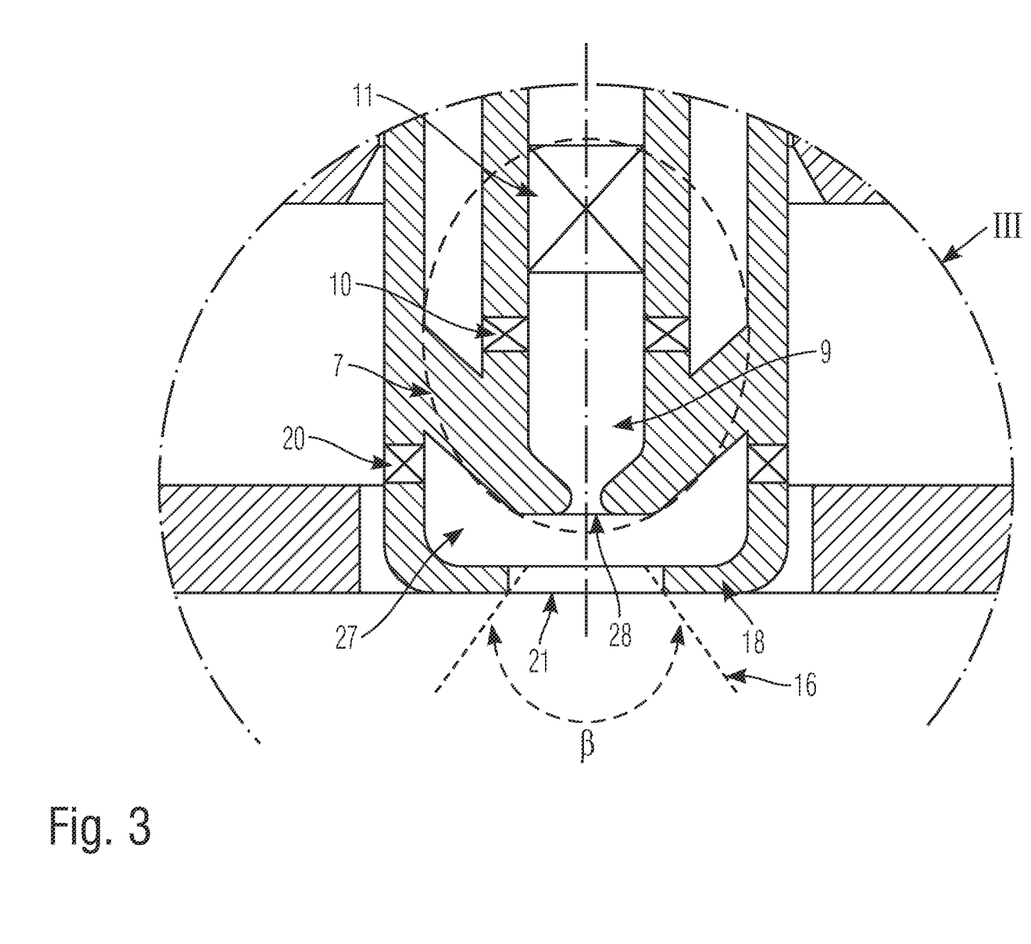
FIG. 3 shows the detail III of FIG. 2.

FIGS. 1 to 3 show different views or details of a combustion chamber 1 of a gas turbine, wherein the combustion chamber is a dual fuel combustion chamber.

FIG. 1 shows a schematic front view or plan view of the combustion chamber 1 against the flow direction of combustion air and fuel. FIG. 2 shows the cross section along the section line II-II of FIG. 1.

The combustion chamber 1 comprises a flame tube 23, which defines a primary combustion zone of the combustion chamber 1. In the flow direction upstream of this flame tube 23, the combustion chamber 1 comprises a prechamber 5 which forms a pre-primary combustion zone of the combustion chamber 1. Flame tube 23 and prechamber 5 are arranged concentrically to one another and have a common longitudinal center axis 4.

The combustion chamber 1 according to the invention is a dual-fuel combustion chamber. In a gas fuel operating mode, a gaseous fuel is combusted in the combustion chamber 1, wherein a mixture of the gaseous fuel and combustion air is supplied via a main swirl body 2 to the combustion chamber 1, namely initially to the prechamber 5 and subsequently to the flame tube 23.

Here, the main swirl body 2 is embodied as a radial swirl body and produces a defined swirl of the mixture of combustion air and gaseous fuel entering the prechamber 5 of the combustion chamber 1 in the gas fuel operating mode. The mixture of the gaseous fuel and the combustion air is ignited in the gas fuel operating mode with the help of an ignition electrode 17 in order to accelerate the gas turbine from the stationary state in the gas fuel operating mode. The ignition electrode 17 is an electric ignition electrode.

In the liquid fuel operating mode of the combustion chamber 1, a liquid fuel is combusted in the combustion chamber 1. The liquid fuel is supplied to the combustion chamber 1 with the help of an atomization apparatus 3. Combustion air required for combusting the liquid fuel is supplied to the combustion chamber 1 via the main swirl body 2.

Both during the combustion of gaseous fuel in the gas fuel operating mode and also during the combustion of liquid fuel in the liquid fuel operating mode exhaust gas is produced. This exhaust gas produced in the combustion chamber 1 can be supplied to a turbine of the gas turbine (not shown) to expand the exhaust gas in the turbine and extract energy in the process that can be utilized, for example, for driving an electric machine.

The atomization apparatus 3 of the combustion chamber 1 comprises a central atomization lance 6, which is positioned approximately on the longitudinal center axis 4 of the prechamber 5 of the combustion chamber 1 or the longitudinal center axis 4 of the flame tube 23 of the combustion chamber 1. Accordingly, the atomization lance 6, based on this longitudinal center axis 4, is positioned centrally, wherein the central atomization lance 6 comprises an atomization nozzle 7, as can be seen in FIG. 3. By way of the atomization nozzle 7 of the central atomization lance 6, the liquid fuel forming an atomization cone 16 can be injected into the prechamber 5 of the combustion chamber 1. Here, the atomization cone 16 is characterized by a spray angle β.

In the shown, preferred exemplary embodiment, the atomization apparatus 3 not only comprises the central atomization lance 6 but in addition to the central atomization lance 6 multiple atomization nozzles 8 which based on the longitudinal central axis 4 of the combustion chamber 1 or based on the longitudinal center axis 4 of the prechamber 5 are decentralized. The ignition electrode 17 is arranged adjacent to one of the decentralized atomization nozzles 8, as shown in FIGS. 1 and 2.

By way of these decentralized atomization nozzles 8, the liquid fuel can likewise be injected into the prechamber 5 of the combustion chamber 1, namely again subject to forming an atomization cone 29, which is characterized by an atomization cone In the preferred exemplary embodiment, the atomization apparatus 3 accordingly comprises the central atomization lance 6 with the atomization nozzle 7 and multiple decentralized atomization nozzles 8. In the following, the central atomization lance 6 and the decentralized atomization nozzles 8 are discussed.

FIG. 3 shows the detail III of FIG. 2, i.e., a detail from the central atomization lance 6 in the region of the atomization nozzle 7 of the same. The atomization nozzle 7 of the central atomization lance 6 comprises a swirl chamber 9, and downstream of the swirl chamber 9, a nozzle orifice 28. The swirl chamber 9 of the atomization nozzle 7 of the central atomization lance 6 can be supplied with the liquid fuel on the one hand via radial swirl generator 10, and on the other hand, via an axial swirl generator 11. Emanating from a first fuel line 12, which has a fuel valve 15, the radial swirl generator 10 is supplied with liquid fuel. Independently of this, the axial swirl generator 11 can be supplied with liquid fuel via a second fuel line 13, which has a second fuel valve 14.

In particular when the first fuel valve 15 is open and the second fuel valve 14 is closed and the liquid fuel is supplied to the swirl chamber 9 of the atomization nozzle 7 of the central atomization lance 6 exclusively via the radial swirl generator 10, the atomization nozzle 7 of the central atomization lance 6 provides an atomization cone of liquid fuel with a spray angle β of greater than 60° and smaller than 100°, preferentially of greater than 70° and smaller than 90°.

Such a spray angle β is utilized in particular for igniting the liquid fuel in the liquid fuel operating mode via the ignition electrode 17.

In particular when the first fuel valve 15 and the second fuel valve 14 are both open and the liquid fuel is supplied to the fuel chamber 9 of the atomization nozzle 7 of the decentralized atomization lance 6 both via the axial swirl generator 11 and also via the radial swirl generator 10, the atomization nozzle 7 of the central atomization lance 6 provides an atomization cone 16 of the liquid fuel with a spray angle β of greater than 40° and smaller than 60°. This atomization angle or spray angle β of the atomization nozzle 7 of the central atomization lance 6 is advantageous in particular after the igniting of the fuel for running up the gas turbine to a no-load rotation speed and for a subsequent operation of the gas turbine under load.

Fuel, which is made available to the swirl chamber 9 of the atomization nozzle of the central atomization lance 6 via the radial swirl generator 10 on the fuel side and if applicable the axial swirl generator 11 on the fuel side can exit the swirl chamber 9 via the nozzle orifice 28.

The fuel-side, radial swirl generator 10 of the central atomization lance 6 and the fuel-side, axial swirl generator 11 of the central atomization lance 6 are preferably configured so that during the operation exclusively of the radial swirl generator 10 at a relevant atomization pressure of one bar to 15 bar the flow of liquid fuel is substantially smaller than during the operation of both swirl generators 10 and 11.

The central atomization lance 6 or the atomization nozzle 7 of the same comprises a hood-like portion 18 which downstream of the nozzle orifice 28 and upstream of an outlet opening 21 of the central atomization lance 6 defines a chamber 27.

It is this chamber 27 into which the liquid fuel enters from the swirl chamber 9 via the nozzle orifice 28, wherein combustion air can continue to be introduced into this chamber 27 via a radial swirl generator 20 on a combustion air side. The combustion air, which is supplied to the chamber 27 via the radial swirl generator 20 on the combustion air side is conducted past the main swirl chamber 2, namely by way of the bypass line 19 shown in FIG. 2.

Accordingly, combustion air is conducted via the radial swirl generator 20 for the combustion air, bypassing the main swirl body 2, via the bypass line 19 and supplied to the chamber 27 of the central atomization lance 6. By way of the swirling of the combustion air supplied to the chamber 27, a swirl jet is produced which promotes the atomization of the liquid fuel entering the chamber 27 via the nozzle orifice 28. Furthermore, this swirled-up air stream cools the atomization nozzle 7 of the central atomization lance 6. The particular combustion air which is conducted past the main swirl body 2 and via the bypass line 19 in the direction of the chamber 27 amounts to between 1% and 10% of the combustion air flow, which can be supplied to the combustion chamber 1 via the main swirl body 2.

As already explained, the atomization apparatus 3 comprises decentralized atomization nozzles 8 in addition to the central atomization lance 6. The decentralized atomization nozzles 8 are preferably arranged on a circular path or pitch circle path 22, wherein the center point of this circular path or pitch circle path 22, on which the decentralized atomization nozzles 8 are positioned, is positioned on the longitudinal center axis 4 of the combustion chamber 1, i.e., on the longitudinal center axis 4 of the flame tube 23 or on the longitudinal center axis 4 of the prechamber 5. The radius $r_{22}$ of this circular path or pitch circle path 22, on which the decentralized atomization nozzles 8 are positioned, amounts to between 0.4 times and 1.1 times the inner radius $r_2$ of the main swirl body 2. The decentralized atomization nozzles 8 can also be arranged on multiple preferentially concentric circular paths or on an elliptical path or on a polygon.

While the atomization nozzle 7, dependent on whether the liquid fuel is exclusively conducted via the radial swirl generator 10 or additionally via the axial swirl generator 11, provides the central atomization lance 6 with a spray angle β of more than 60° or less than 100° or a spray angle β of more than 40° or less than 60°, the decentralized atomization nozzles 8 each provide an atomization cone 29 with an atomization angle or spray angle ψ that is greater than 25° and smaller than 90°.

The decentralized atomization nozzles 8 are preferentially nozzles which are configured as self-exciting nozzles and provide an oscillating fluid jet. In this way, a good premixing of the liquid fuel with the combustion air can be provided. The central atomization nozzles 8, emanating from a fuel line 24 having a fuel valve 30, can be supplied with liquid fuel independently of the atomization nozzle 7 of the central atomization lance 6.

With the help of the decentralized atomization nozzles 8, which are arranged on the circular path or pitch circle path 22 and are equally distributed preferentially along the circular path or pitch circle path 22, the liquid fuel is introduced into the combustion chamber 1, namely initially into the prechamber 5 forming a homogeneous distribution with the combustion air. At the same time, a part premixing of combustion air and liquid fuel is provided, in particular promoted in that the decentralized atomization nozzles 8 are arranged adjoining the outlet of the main swirl body 2.

A gas turbine according to the invention comprises a combustion chamber according to the invention and a turbine. In the combustion chamber, fuel is combusted in the presence of combustion air. In the turbine, the generated exhaust gas is expanded in order to extract energy in the process for example for driving an electric machine.

The invention, furthermore, relates to a method for operating a gas turbine. The gas turbine comprises the combustion chamber 1 according to the invention, which is a dual-fuel combustion chamber.

In the gas fuel operating mode, the combustion chamber 1 is supplied with a mixture of gaseous fuel and combustion air via the main swirl body 2.

In the liquid fuel operating mode, the combustion chamber 1 is supplied with liquid fuel via the atomization apparatus 3, combustion air is at least partly conducted via the main swirl body 2 and if required via the bypass line 19 past the main swirl body 2 in the direction of the chamber 27 of the central atomization lance 6.

For igniting the gas turbine in the liquid fuel operating mode and for starting-up the gas turbine in the liquid fuel operating mode from the stationary state, the gas turbine is operated so that the combustion chamber 1 is initially supplied with the liquid fuel in the liquid fuel operating mode exclusively via the central atomization lance 6.

For igniting the liquid fuel, the liquid fuel is initially exclusively supplied to the atomization nozzle 7 via the radial swirl generator 10 in order to thus provide, via the central atomization lance 6, a spray cone 16 with the spray angle or atomization angle β, which for the igniting is greater than 60° and smaller than 100°, preferentially greater than 70° and smaller than 90°. In this case, the liquid fuel can then be favorably ignited via the ignition electrode 17 so that a flame burning in a stable manner can form. In this case, exclusively the fuel valve 15 is open and the fuel valves 14 and 30 are then closed.

Following the forming of the flame burning in a stable manner, the liquid fuel, for accelerating the gas turbine in the direction of a no-load rotational speed, is additionally supplied with the liquid fuel also via the axial swirl generator 11. In the process, the spray angle β of the central atomization lance 6 is then reduced in size to an angle of more than 40° and less than 60°. By way of this, a disadvantageous wetting of the walls of prechamber 5 and flame tube 23 of the combustion chamber 1 with liquid fuel can be avoided. The fuel valve 14 is also open then. The fuel valve 30 is still closed.

Once the no-load rotational speed of the gas turbine has been reached, the introduction of the liquid fuel into the combustion chamber 1 via the decentralized atomization nozzle 8 additionally takes place. In this way, an optimal and effective combustion of the liquid fuel can then be ensured during the operation, namely while reducing exhaust gas emissions, in particular while reducing nitrogen oxide emissions. The fuel valve 30 is then also open.

By way of the central atomization lance 6 of the atomization apparatus 3, liquid fuel is introduced into a central region of the combustion chamber 1, namely a central region of prechamber 5 and flame tube 23. This is advantageous for a stable combustion. Introducing the liquid fuel via the central atomization lance 6 is typically effected not homogeneously the combustion air, no intensive premixing of liquid fuel and combustion air takes place in the region of the central atomization lance 6. By way of the decentralized atomization nozzles 8, the liquid fuel is homogeneously distributed in the combustion air. Furthermore, a part premixing of liquid fuel and combustion air is achieved through the decentralized atomization nozzles 8. This is advantageous in particular for reducing exhaust gas emissions such as nitrogen oxide emissions.

Figure 4:
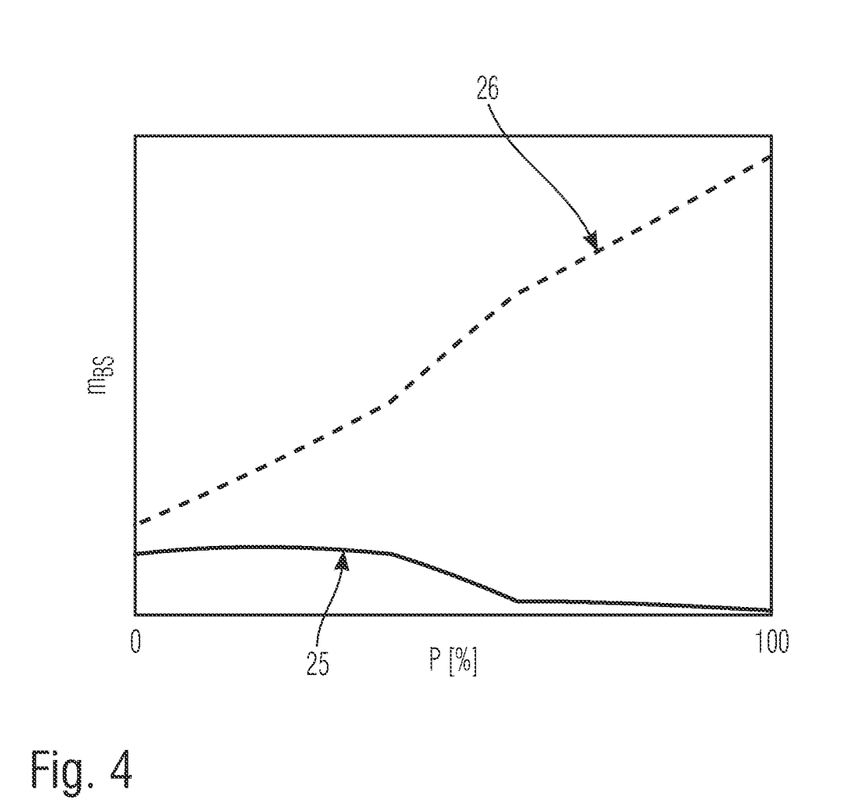
FIG. 4 is a diagram for illustrating a method according to the invention for operating the gas turbine according to the invention.

FIG. 4 illustrates with curve profiles 25 and 26 a fuel mass flow mes of fuel which in the liquid fuel operating mode is introduced into the combustion chamber 1 via the central atomization lance 6 and via the decentralized atomization nozzles 8 as a function of the load P of the gas turbine.

The curve profile 25 corresponds to the mass flow of fuel which is introduced into the combustion chamber 1 via the central atomization lance 6. The curve profile 26 illustrates mass flow of liquid fuel that in the liquid fuel operating mode is introduced into the combustion chamber 1 via the decentralized atomization nozzles 8.

At a load P of 0% (no load of the gas turbine) fuel is introduced into the combustion chamber 1 as already explained according to the curve profile 25 both via the central atomization lance 6 as well as according to the curve profile 26 via the decentralized atomization nozzles 8.

With increasing load starting out from no-load (0%), the fuel quantity introduced into the combustion chamber 1 via the decentralized atomization nozzles 8 according to the curve profile 26 rises continuously and the fuel quantity introduced via the central atomization lance 6 remains initially approximately constant according to the curve profile 25.

With further increasing load, the fuel quantity introduced into the combustion chamber 1 via the central atomization lance 6 falls according to the curve profile 25. However, the central atomization lance 6 is not deactivated but, on the contrary, liquid fuel is introduced into the combustion chamber 1 via the central atomization lance 6 even at a load of 100% (full load of the gas turbine). By way of this, the exhaust gas emissions can be particularly greatly reduced in the full load mode since the fuel quantity introduced into the combustion chamber 1 via the central atomization lance 6 is reduced to a minimum.

In this connection it is advantageous that the chamber 27 is supplied with combustion air at full load via the radial swirl generator 20 in order to stabilize, in particular with small liquid fuel quantities, which are supplied via the atomization nozzle 7, the spray cone 16 by way of the combustion air introduced into the chamber 27 via the radial swirl generator 20.

Because the liquid fuel is also supplied via the central atomization lance 6 even at full load, i.e., over the entire load range of the gas turbine in the liquid fuel operating mode, rapid load changes can be realized. Furthermore, the central atomization lance 6 need not be purged or cleaned, since liquid fuel is continuously introduced into the combustion chamber 1 in the liquid fuel operating mode precisely via the same.

In particular the quantity of liquid fuel which in the liquid fuel operating mode at full load or near full load is introduced in the combustion chamber 1 via the central atomization lance 6 is around less than 5%, preferentially around 2% of the total quantity of the fuel quantity introduced into the combustion chamber 1. In this way a particularly efficient operation of the gas turbine can be guaranteed at full load, in particular while minimizing exhaust gas emissions such as nitrogen oxide emissions.

With the present invention it is thus possible in the liquid fuel operating mode on the one hand to ignite a gas turbine in a stable manner while on the other hand the gas turbine, starting out from a rotational speed of zero after the igniting, can be run up to the no-load rotational speed in a stable manner. In addition to this, a robust and stable combustion with low emissions can be realized over the entire operating range of the gas turbine between no load or full load. In particular, nitrogen oxide emissions of less than 100 vppm @15% $O_2$.

In the gas fuel operating mode, the fuel valves 14, 15, 30 are all closed. The central atomization lance 6 however can be utilized in order to supply, via the chamber 27 of the same, combustion air past the main swirl body 2 to the combustion chamber 1. The ignition electrode, which in the liquid fuel operating mode serves for igniting the liquid fuel, also serves for igniting the gas in the gas fuel operating mode.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

REFERENCE LIST

1 Combustion chamber
2 Main swirl body

3 Atomization apparatus
4 Longitudinal center axis
5 Prechamber
6 Atomization lance
7 Atomization nozzle
8 Atomization nozzle
9 Swirl chamber
10 Radial swirl generator
11 Axial swirl generator
12 Fuel line
13 Fuel line
14 Fuel valve
15 Fuel valve
16 Atomization cone
17 Ignition electrode
18 Hood-like portion
19 Bypass
20 Radial swirl generator
21 Outlet opening
22 Pitch circle
23 Flame tube
24 Fuel line
25 Curve profile
26 Curve profile
27 Chamber
28 Nozzle orifice
29 Atomization cone
30 Fuel valve

The invention claimed is:

1. A combustion chamber of a gas turbine, for combusting a fuel in the presence of combustion air, the combustion chamber being configured as a dual fuel combustion chamber, comprising:
a main swirl body;
an atomization apparatus arranged entirely upstream of the main swirl body having an atomization lance having an outer cylinder and an inner cylinder that is coaxially arranged with respect to the outer cylinder that comprises an atomization nozzle, the atomization nozzle comprising a swirl chamber and, downstream of the swirl chamber, a nozzle orifice;
a prechamber downstream of the main swirl body, wherein the prechamber diameter is smaller than a main swirl body diameter;
a radial swirl generator arranged in the inner cylinder of the atomization lance;
and an axial swirl generator arranged in the inner cylinder of the atomization lance upstream of the atomization nozzle and the radial swirl generator,
wherein the combustion chamber is configured such that:
in a gas fuel operating mode the combustion chamber is supplied with a mixture of gaseous fuel and the combustion air via the main swirl body, and
in a liquid fuel operating mode the combustion chamber is supplied with liquid fuel via the atomization apparatus and supplied with the combustion air via the main swirl body,
wherein the atomization nozzle is arranged centrally with respect to a longitudinal center axis of the combustion chamber, or arranged on a longitudinal center axis of the prechamber,
wherein the swirl chamber is configured to be supplied with the liquid fuel via the radial swirl generator and the axial swirl generator,
wherein the atomization apparatus comprises multiple atomization nozzles that are arranged in a decentralized manner with respect to the longitudinal center axis of the combustion chamber, or arranged in a decentralized manner with respect to the longitudinal center axis of the prechamber, wherein the decentralized multiple atomization nozzles are inactive during igniting and starting up, and to be switched on once a no-load rotational speed has been reached,
wherein both the central atomization lance and the decentralized multiple atomization nozzles are, in the liquid fuel operating mode, utilized throughout an operating range between no load and full load to supply the liquid fuel to the combustion chamber,
wherein with increasing load starting from the no load, the decentralized multiple atomization nozzles introduce the liquid fuel into the combustion chamber in a continuously increasing quantity,
wherein with the increasing load starting from the no load, the central atomization lance introduces the liquid fuel into the combustion chamber initially at a constant level and then at a level that decreases, but without being deactivated even at the full load,
wherein the central atomization lance comprises a hood-like portion that has a first segment that extends axially from the outer cylinder of the central atomization lance, a second segment that extends radially inward, and an arcuate segment between the first and second segments, wherein:
the hood like portion defines a chamber arranged downstream of the nozzle orifice of the atomization nozzle of the central atomization lance and upstream of an outlet opening of the central atomization lance,
the outlet opening is defined by the second segment of the hood, and
a second radial swirl generator is arranged in the outer cylinder of the atomization lance upstream of the atomization nozzle that supplies the chamber with the combustion air, so as to bypass the main swirl body via a bypass,
wherein the chamber is supplied with the liquid fuel from the swirl chamber via the nozzle orifice, and
wherein the second radial swirl generator supplies the chamber with the combustion air at full load so as to stabilize the spray cone by the introduction of the combustion air into the chamber by the second radial swirl generator, and
wherein the outlet opening of the central atomization lance and respective outlets of the decentralized multiple atomization nozzles are arranged on a same plane at an upstream end of the combustion chamber and radially within the main swirl body, and
wherein an upstream end of the main swirl body is arranged on the same plane and the downstream end of the main swirl body is entirely upstream end of the prechamber.

2. The combustion chamber according to claim 1, wherein the radial swirl generator is supplied with the liquid fuel via a first fuel line and the axial swirl generator is supplied with the liquid fuel via a second fuel line.

3. The combustion chamber according to claim 2, wherein the first fuel line has a first fuel valve and the second fuel line has a second fuel valve.

4. The combustion chamber according to claim 3, wherein the atomization nozzle of the central atomization lance provides an atomization cone with a spray angle ($\beta$) of greater than 60° and smaller than 100° in a case in which the first fuel valve is open, the second fuel valve is closed and the liquid fuel is supplied to the swirl chamber exclusively via the radial swirl generator, and the atomization nozzle provides an atomization cone with a spray angle (β) of greater than 40° and smaller than 60° in a case in which the first and second fuel valve are both open and the liquid fuel is supplied to the swirl chamber via the axial and radial swirl generators.

5. The combustion chamber according to claim 4, wherein the combustion air that can be supplied to the combustion chamber while bypassing the main swirl body via the chamber between the nozzle orifice and the atomization nozzle and the hood-like portion is between 1% and 10% of the combustion air that can be supplied to the combustion chamber via the main swirl body.

6. The combustion chamber according to claim 5, wherein the decentralized multiple atomization nozzles are positioned on a circular path or pitch circle path extending about the longitudinal center axis of the combustion chamber or about the longitudinal center axis of the prechamber.

7. The combustion chamber according to claim 6, wherein a center point of the circular path or pitch circle path, on which the decentralized multiple atomization nozzles are positioned, is positioned on the longitudinal center axis of the combustion chamber or on the longitudinal center axis of the prechamber, wherein a radius of the circular path or pitch circle path, on which the decentralized multiple atomization nozzles are positioned, is between 0.4 times and 1.1 times an inner radius of the main swirl body.

8. The combustion chamber according to claim 7, wherein the decentralized multiple atomization nozzles each provide an atomization cone with a spray angle (ψ) of greater than 25° and smaller than 90°.

9. The combustion chamber according to claim 8, wherein the decentralized multiple atomization nozzles are configured as self-exciting nozzles providing an oscillating fluid jet.

10. A gas turbine, comprising:
the combustion chamber according to claim 1, and
a turbine configured to expand an exhaust gas produced during a combustion in the combustion chamber.

11. A method for operating the gas turbine according to claim 10, comprising:
supplying, in the gas fuel operating mode, to the combustion chamber a mixture of the gaseous fuel and the combustion air via the main swirl body, and
supplying to the combustion chamber, in the liquid fuel operating mode:
the liquid fuel to the combustion chamber via the atomization apparatus, and
the liquid fuel and the combustion air via the main swirl body.

12. The method according to claim 11, wherein for igniting the gas turbine in the liquid fuel operating mode the swirl chamber of the central atomization lance is supplied with the liquid fuel exclusively via the radial swirl generator and wherein after the igniting of the gas turbine the swirl chamber of the central atomization lance is additionally supplied with the liquid fuel via the axial swirl generator.

13. The combustion chamber according to claim 1, further comprising a flame tube arranged concentrically with the prechamber and sharing the longitudinal center axis of the prechamber, wherein the flame tube is downstream of the prechamber.

* * * * *